March 24, 1931. J. N. SMITH 1,797,374
THERMAL INSULATION OF ELECTROLYTIC CELLS
Filed Aug. 21, 1928 2 Sheets-Sheet 1

James N. Smith, Inventor,
By Lewis J. Doolittle, Atty.

March 24, 1931.  J. N. SMITH  1,797,374
THERMAL INSULATION OF ELECTROLYTIC CELLS
Filed Aug. 21, 1928   2 Sheets-Sheet 2

Patented Mar. 24, 1931

1,797,374

UNITED STATES PATENT OFFICE

JAMES NORMAN SMITH, OF TORONTO, ONTARIO, CANADA, ASSIGNOR, BY MESNE ASSIGNMENTS, TO WESTINGHOUSE ELECTRIC & MANUFACTURING COMPANY, A CORPORATION OF PENNSYLVANIA

THERMAL INSULATION OF ELECTROLYTIC CELLS

Application filed August 21, 1928. Serial No. 301,143.

This invention relates to means for and method of increasing and conserving or regulating the temperature of electrolytic apparatus, particularly of the type employed in the electrolysis of water.

The invention, as applied to electrolytic cells, comprises, generally, the thermal insulation of the cell by enclosing the electrolyzer cells of the apparatus in a heat insulating hood, causing a heat conductive fluid which is electrically non-conductive, to flow in said hood and through passages about said cells so as to effect an exchange of heat, and also permitting an exchange of heat to take place, if desired, through vents between the fluid and the tanks associated therewith, the object of this invention being primarily to thermally insulate the cells from the atmosphere, and, at the same time, to conserve and regulate the temperature of the cells and, when desired, their associated tanks.

Another function of the insulating hood as applied to the electrolyzer or to the separating tank, or to both, is to prevent heat loss from the cell to the surrounding atmopshere so that the heat caused by the electrical resistance of the cell may thereby produce a greater increase of temperature than could be otherwise obtained by said resistance heat.

An embodiment of my invention as applied to an electrolytic cell, is illustrated in the accompanying drawings, wherein:—

Figures 1, 2:
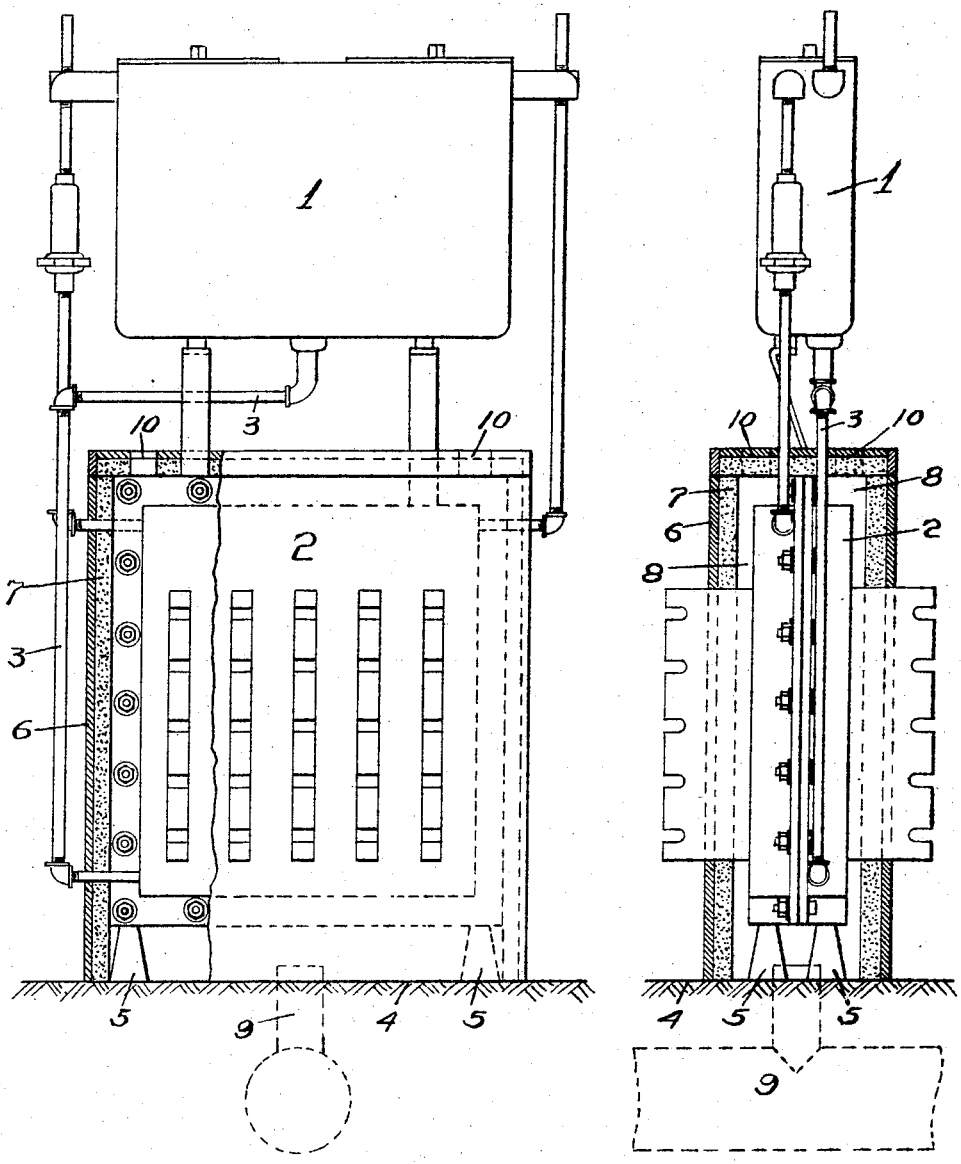
Fig. 1 is an elevation, partly in section, of electrolytic apparatus showing the insulating hood enclosing a single cell unit.
Fig. 2 is a side view of Fig. 1, partly in section.
Figure 3:
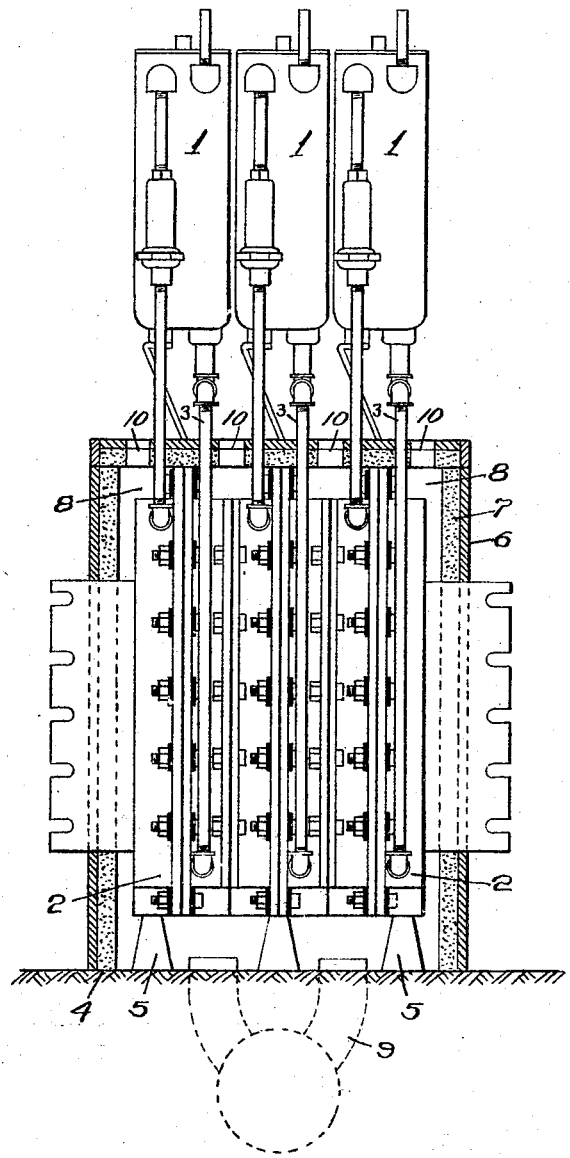
Fig. 3 is a view similar to Fig. 2 of electrolytic apparatus made up of a plurality of interconnected cells and tanks.

The electrolytic apparatus to which my invention is applied, for the purposes of illustration in the present application, comprises one or more tanks 1 supplying electrolyte to the electrolyzer cells 2 through the pipe or pipes 3. The cells are shown as raised above the floor level 4 and supported by insulators 5.

Placed around and enclosing the cell is a hood 6 lined with heat insulating material 7, said hood being spaced from the cell so as to provide passages 8, 8, for the circulation of a heat conducting fluid, such as air, nitrogen or hydrogen gas, etc., which may be injected into or removed from the hood through ducts 9, 9.

In some cases the circulating fluid is introduced from duct 9, leaving at openings 10 in sufficient amount to cool or heat the cell as the case may be, and, if required, but the supplying of heat conductive fluid will not always be required, since, to some extent, the heat insulating hood with all openings closed, the openings being closed by inserting suitable plugs therein, may be relied upon to conserve the heat of the cells, and prevent its dissipation into the atmosphere.

Where an additional heating of the tanks 1 is desired the heated air within the hood 6 will be vented and pass through the openings 10, 10, the plugs being removed therefrom, in the top thereof and heat the tank 1 and the electrolyte therein, so that, as nearly as possible, the temperature of the electrolyte in the tank shall approach that of the cell.

In many cases the fluid supply ducts 9 may be omitted and the openings 10 closed, where an exchange of heat between the cell hood and the tank is not required.

The hood and its lining are preferably made in sections so that it may be readily positioned around or removed from the cell.

Having described my invention, what I claim is:

1. An insulating hood for apparatus of the character described provided with a heat insulating lining enclosing and spaced from the apparatus to provide passages for a heat conducting and electrically non-conducting fluid to circulate and having closable inlets and outlets to permit said fluid to pass through said hood.

2. A thermal insulation device for electrolytic cells comprising a heat insulating hood adapted to enclose the cells and provide for a heat conducting and electrically non-conducting fluid to circulate therein between said cells and hood to cause a heat exchange between the cells and prevent heat radiation to the exterior of said hood.

3. A thermal insulation device for electrolytic cells comprising a heat insulating hood adapted to enclose the cells and provided with means for introducing a heat conducting and electrically non-conducting fluid into said hood and causing said fluid to flow through said hood about the cells, said hood being also provided with means for regulating the flow of said fluid therethrough.

4. The combination with electrolytic apparatus comprising electrolyzer cells and separating tanks associated therewith, of a heat insulating hood enclosing said cells and provided with means for introducing a heat conducting and electrically non-conducting fluid into said hood and causing said fluid to flow through said hood about the cells, and means for causing said fluid to flow from said hood about said tanks to maintain the temperature of the tanks at approximately that of said cells.

Signed at Toronto, Province of Ontario, in the county of York, and Dominion of Canada, this 16th day of Aug., A. D. 1928.

JAMES NORMAN SMITH.